April 27, 1954   F. D. BERGSTEIN ET AL   2,676,642
MEANS FOR HEAT-SEALING FILMS
Filed Aug. 27, 1953   2 Sheets-Sheet 1
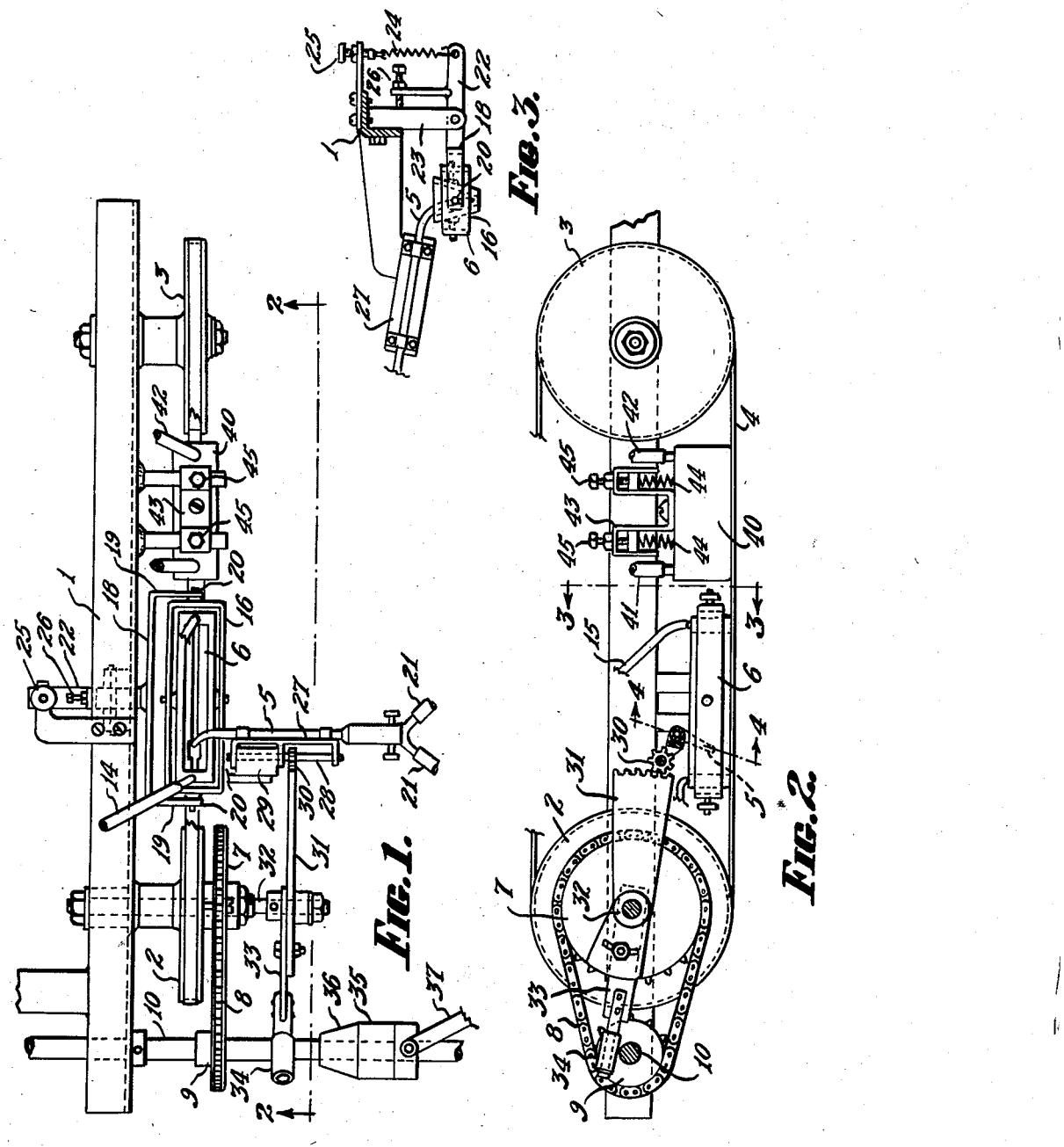
INVENTORS.
FRANK D. BERGSTEIN
AND WALTER HAAS,
BY Allen & Allen
ATTORNEYS.

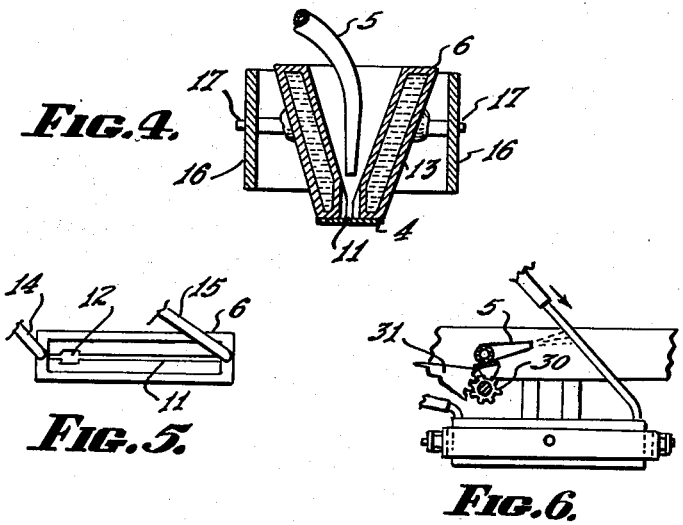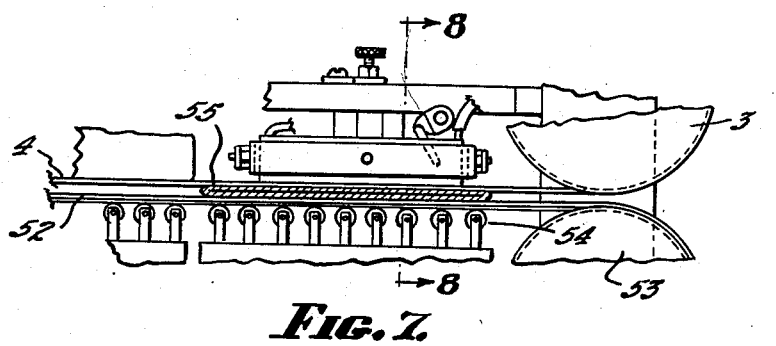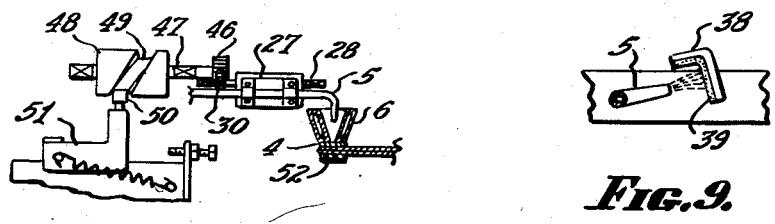

Patented Apr. 27, 1954

2,676,642

UNITED STATES PATENT OFFICE 2,676,642

MEANS FOR HEAT-SEALING FILMS

Frank D. Bergstein and Walter Haas,
Middletown, Ohio

Original application March 15, 1950, Serial No. 149,708, now Patent No. 2,660,219, dated November 24, 1953. Divided and this application August 27, 1953, Serial No. 376,829

14 Claims. (Cl. 154—42)

Our invention has to do with the joining of juxtaposed portions of amorphous film by heat so as to provide seams therein and is a division of our copending application Serial No. 149,708, filed March 15, 1950, for Method and Means for Heat-Sealing Films, now Patent No. 2,660,219.

Hitherto there has been a wide use of various amorphous or non-fibrous films of commerce in the manufacture of liquid-tight or moisture-tight bags. Certain types of films offer little difficulty in the formation of heat-sealed seams. For example, cellophane coated with a fusible sealing substance, is readily sealed by the application of pressure and sufficient heat to melt or soften the sealing substance, the film itself retaining its strength substantially unimpaired throughout the sealing operation. Other films have the property of softening sufficiently to become sealed together while retaining over a wide range of temperature sufficient inherent strength to be handled without disruption at the seam area.

There are, however, certain types of film, desirable for various qualities of proofness, strength, inertness, non-toxicity and the like, which have only a very narrow range of temperature lying between a solid condition and a very soft condition in which they are non-self-sustaining. Such films, when heated, lose their strength very rapidly, so that handling becomes difficult. They also become sticky when heated, so that it is difficult to separate the joined parts from the seam-forming instrumentalities in the heat softened condition of the seamed parts. Also, on slight overheating, such films tend to liquefy and even to collect in droplets or to pull apart through surface tension effects, thus destroying the integrity of the films and the seams formed therein. These difficulties have presented serious problems to the practical art, and in the case of some films, have hitherto prevented the formation of adequate seals or seams by machinery in automatic or continuous operation.

An example of such a film, presenting the above difficulties in a high degree, is a film of polyethylene. Polyethylene in thin films is quite strong at room temperatures and is highly desirable by reason of its proofness and other characteristics for the manufacture of liquid-tight and moisture-tight bags. But it is inherently readily fusible, in the sense that the application of heat sufficient to soften the material for sealing purposes is likely unless controlled more exactly than has hitherto been possible in automatic machines, to soften it too much, rendering the production of seams impossible, or producing seams which are not sound. Pliofilm, which is an amorphous film formed from chlorinated rubber hydrocarbon, presents similar difficulties, although in somewhat lesser degree, and is of that type of film which for convenience hereinafter we shall refer to as "readily fusible."

The primary object of our invention is to provide seaming mechanism for readily fusible films whereby adequate and reliable continuous seams may be formed therein with the avoidance of the difficulties we have discussed.

The primary object and other objects of the invention, which will be made clear as the description proceeds, or will be apparent to one skilled in the art upon reading these specifications, we accomplish by the use of that mechanism of which we shall now describe exemplary embodiments.

Reference is now made to the accompanying drawings wherein:

Figure 1 is a partial elevational view of sealing apparatus employing a sealing torch and shield.

Figure 2 is a sectional view of the device illustrated in Figure 1 taken along the line 2—2 of Figure 1.

Figure 3 is a partial sectional view taken along the line 3—3 of Figure 2.

Figure 4 is a transverse sectional view of a shield and torch assembly taken along the line 4—4 of Figure 2.

Figure 5 is a plan view of a shield element.

Figure 6 is an elevational view of the shield element and torch mounting apparatus.

Figure 7 is a partial elevational view of sealing apparatus particularly adapted to seal the ends of bag tubes.

Figure 8 is a sectional view taken along the line 8—8 of Figure 7 showing the torch operating mechanism.

Figure 9 is a partial sectional view showing the use of a movable torch and a shield for the torch flame.

In the sealing of polyethylene films by heat, there is a spread of only about 5 degrees between a condition of the material too solid to weld together and a condition of the material too soft to maintain its integrity when handled on conventional sealing apparatus. This has hitherto rendered the continuous or automatic sealing of polyethylene films impracticable.

Briefly, in the practice of our invention, we have found that successful and entirely dependable heat-welded seams may be formed in such films as polyethylene which are very readily fusible if mechanism is employed such as hereinafter described generally and as specifically set forth in our copending application referred to hereinbefore. In one aspect of this mechanism the film is pulled over a former, and the lapped portions are supported from beneath by moving means. A heat conducting element is caused to travel with lapped portions of the film over the area of seam formation, heat is applied through the heat conducting element by a heating device of narrower effective width and arranged to apply the heat intermediate the edges of the traveling member so that a heat gradient is established in the traveling member and in the lapped portions of the film, and the welded seam is allowed to travel with the moving members until the fused parts have congealed or hardened before separation therefrom. By means and a method such as have just been briefly characterized, we can continuously and perfectly form welded seams in polyethylene film materials. We shall proceed to a more particular description of the mechanism by which the welding of the seams is accomplished.

Referring to Figures 1 and 2 of the drawings we have shown a seam welding device comprising a frame 1 on which are supported the spaced apart sheaves 2 and 3 about which pass an endless metallic belt 4 having good heat conductivity, in the manner illustrated. The lapped film portions to be seamed or welded are brought in contact with the moving belt 4, and during the movement of the lapped film portions with the belt, heat is applied to the belt to effect a weld or seam in accordance with our invention.

Heat is applied to the belt by means of a flame heating element 5 surrounded by a shield 6 acting to direct the flame against the central portion of the belt in a confined area substantially narrower than the belt itself.

The arrangement of the flame or torch and the shield is such that the flame does not contact the outer edges of the belt 4, but serves to heat only the central portion of the belt. Thus heat sufficient to fuse the substance of the lapped portions of the film is transmitted only through the central portion of the belt 4, and a temperature gradient is established by the belt due to the loss of heat at the edges thereof by radiation and conduction and by the positive cooling action of the bottom portions of the shield. The edges of the belt are therefore substantially cooler than the longitudinal central portion of the belt over the welded area and in particular the edges of the belt are maintained below the temperature required to soften the material of the film to welding or fusion consistency.

We have found where a heating element of fixed width and uniform temperature is applied to the films, difficulties are had, as already explained, with excess fusion of the film substance, and these are greatest along the side edges of the heating element. Our apparatus entirely obviates these difficulties and results in the application of heat to the lapped portions of the film in accordance with a gradient curve indicating a gradual lowering of temperature from a welding heat adjacent the center of the belt to temperatures outwardly therefrom at both sides, which temperatures are well below the fusion temperature of the material.

The belt element 4 will be preferably driven at the same speed as the moving film and hence the belt does not tend to disrupt the film by physical interference, but rather tends to maintain the softened portions of the film in position during the welding operation. As will hereinafter be explained, cooling may be applied to the welded seam through the belt element 4 beyond the welding zone, i. e., the area of heat application, so as to cause the welded parts to harden or congeal fully prior to their separation from the belt. Thus the development of stickiness in the film material adjacent the under surface of the belt in the welding zone is not of consequence, and does not lead to the disruption of the film.

The belt 4 will be driven, and to this end we have shown a sprocket 7 attached to the sheave 2; and this sprocket is connected by a chain 8 to a sprocket 9 on the drive shaft 10.

The torch and shield heating means enables us to apply heat to the sealing belt independently of belt displacement. The belt thus becomes uniformly heated irrespective of minor deviations in the belt itself, particularly at the point of weld. As can be best seen in Figure 4, the shield element is of trough-like configuration, being V-shaped in transverse vertical section. As shown in this figure and in Figure 5, the lower end of the trough is open in such manner as to form a slot 11 which is narrower than the belt 4. One portion of the slot, i. e., that portion where the flame from the torch 5 impinges on the belt, may be made somewhat wider, as at 12 in Figure 5.

The walls of the V-shaped trough 6 are hollow and filled with a cooling fluid 13 which may be circulated through the trough by means of the inlet and outlet tubes 14 and 15, seen in Figure 5. The trough element rides upon the belt 4 with the lower edge portions thereof contacting the outer marginal portions of the belt, thereby serving to cool those portions by conduction, while heat is applied to the belt centrally through the slot 11.

The trough is mounted in gimbalwise position overlying the belt by means of bracket 16, the trough or shield being supported in the bracket by means of pins 17. The bracket 16 is mounted to the machine frame 1 by means of the forked bracket 18, in the manner illustrated, the bracket 18 having forked ends 19 to which the bracket 16 is connected by means of pins 20. The pairs of pins 17 and 20 serve to pivotally mount the trough for both longitudinal and transverse movement to compensate for any irregularities in the traveling surface of the belt, the shield being free to move as necessary to maintain surface conformity with the belt.

The torch or flame heating element 5 may be mounted on the trough 6 or bracket 16 if desired, suitable flexible tubing 21 being provided for the torch gases. However, we prefer to mount the torch in a movable fashion on an external support so that upon stoppage of the belt, the torch tip may be swung out of the trough element 6 to some position in which it cannot apply heat to the belt. When this is done, the continuous passage of cooling fluid through the trough element 6 will make it unnecessary to remove the trough from the belt, and scorching or burning of the film will be prevented.

As shown in Figure 3, the supporting bracket 18 is mounted to a lever arm 22 pivoted centrally on a support 23 attached to the machine frame. The remaining end of the lever arm is connected by a tension spring 24 to an adjustment means 25 on a support carried by the machine frame, and an adjustable stop means 26 is provided to fix the lowermost position of the trough element. The torch element 5 is provided with a curved end to enter the trough in the relationships shown in Figure 4, and the torch is mounted upon an element 27 which is adapted to rotate. This element, as most clearly shown in Figure 1, is U-shaped or E-shaped and is affixed to a shaft 28 rotatively mounted in a bearing 29 on the machine. It will be evident that as the shaft 28 is caused to rotate, the torch may be swung from that position illustrated in Figure 2 (corresponding to the operative positions described in connection with Figures 4 and 5) to the position shown in Figure 6. For rotating the shaft 28, we affix to it a toothed pinion 30 which meshes with the teeth of a segment element 31 mounted so as to rock upon the shaft 32 of sprocket 2 carrying the belt 4.

An adjustable extension 33 is connected to the segment 31, the extension bearing a cam following roller 34 at its end. An element 35 having a tapered nose 36 is slidably mounted upon the shaft 10; and the sliding element is connected by a link 37 to the clutch mechanism (not shown) controlling the operation of the machine. The arrangement will be such that operation of the clutch will result in swinging the torch 5 into and out of operating position. It will be understood that as the tapered nose of the sliding element 35 is moved against the cam follower 34, the segment 31 will be moved, operating the torch as aforesaid through the pinion 30 and the torch mounting element 27.

It is intended that the torch will remain burning throughout the entire operating period of the machine including such temporary stoppages as may be required for adjustment. As a consequence, when the torch is swung to the inoperative position, we prefer to provide a shield against which its flame may impinge. For simplicity, such shield has not been illustrated in Figures 1 through 8; but Figure 9 shows the torch 5 in upraised position with its flame impinging against a shield element 38, faced as at 39 with asbestos or other heating resistant refractory.

In addition to the heating element, a cooling element, such as the fluid cooled block 40, may be positioned beyond the torch and shield in the direction of movement of the belt 4, the cooling element acting, as already explained, to reduce the temperature of the central portion of the belt prior to separating the welded or seamed film from the belt. As illustrated the cooling means 40 may be provided with fluid inlet and outlet tubes 41 and 42; and the unit may be supported from the machine frame by means of the bracket means 43 which includes spring elements 44 adjustable by means of adjustment screws 45 acting to maintain the cooling means in contact with the belt.

A modified form of our invention is illustrated in Figure 8 of the drawings, this modification having been found particularly suitable for the formation of end closure seams in tubular bag lengths. Here the torch 5 is mounted on the torch holding element 27 as before, and this, in turn, is mounted on the shaft 28. The pinion 30 on this shaft meshes with a pinion 46 upon a shaft 47 suitably journaled in bearing elements, not shown. The shaft 47 in this instance bears a cam element 48 having a helical cam groove 49 of such pitch that the shaft may be rotated by a cam follower 50 engaged in the groove and moved parallel to the axis of the shaft 47. The cam follower 50, which, as illustrated, is in the form of a roller, is mounted upon a slider 51 actuated in the same manner as the sliding element 35 described in connection with Figure 1.

The torch itself may be of any known form for the burning of gaseous fuel in a jet of desired dimensions and producing a desired degree of heat. The nature of the fuel and whether it is burned in admixture with air or with a more strongly oxidizing gas, such as oxygen, do not constitute limitations on our invention. By way of example, we may use acetylene or natural gas as the fuel, with or without oxygen. The torch will have those features of adjustment conventional in known torches so that the size and shape of the jet and the amount of heat produced can be varied in accordance with specific requirements. It will be understood that the quantity of heat produced per unit of time by the flame will be proportioned to the degree of heat required for specific sealing operations and the speed of travel of the material being sealed through the machine.

We have, however, found it readily possible to effect seam formation positively, continuously and without skips by applying heat to the film materials through a metallic band from a torch or flame essentially confined, except for a narrow line of contact with the belt, in a fluid cooled housing as described; and the flame, used as herein taught, serves to heat the belt or band uniformly so as to effect welding without skips in spite of sporadic displacements of the band, such as may be due to kinks or bends therein, or the presence of a welded seam area, providing the supporting means used opposite the band serves to keep the film materials in contact therewith. Such supporting means, as already indicated, may comprise a moving means such as the former incorporating rollers, as described in our aforementioned copending application, or it may take the form of a lower band element such as that illustrated at 52 in Figure 7, the band being adapted to pass around spaced apart sheaves, one of which is shown at 53. As shown, a plurality of small rollers 54 may be supported beneath and in contact with the belt 52. A lapped film element passing between the bands 4 and 52 is illustrated at 55.

Modifications may be made in our invention without departing from the spirit of it. Having thus described our invention in an exemplary embodiment, what we claim as new and desire to secure by Letters Patent is:

1. In combination for the purpose described, a trough-shaped shield having an elongated narrow slit therein, a torch having an angularly bent end, a rotative support for said torch so located as to direct said torch toward said shield and upon rotation to move said torch from a position in which its angularly disposed end is directed into said shield to a position in which said end is directed away from said shield, and means for actuating said rotative support.

2. In combination for the purpose described, a trough-shaped shield having an elongated narrow slit therein, a torch having an angularly bent end, a rotative support for said torch so located as to direct said torch toward said shield and upon rotation to move said torch from a position in which its angularly disposed end is directed into said shield to a position in which said end is directed away from said shield, and means for actuating said rotative support, together with a refractory covered element toward which said torch end will be directed in the last mentioned torch position.

3. In combination, sheaves mounted upon supporting means, a sealing belt traversing said sheaves, a heating element adapted to contact said belt upon one side, said heating element comprising a fluid-cooled, trough-shaped shield having a portion with an elongated slot adapted to be brought against said belt, and a torch having an end portion directed into said shield, whereby the flame from said torch will impinge upon said belt.

4. The combination claimed in claim 3 wherein said elongated slot has an effective width which is substantially less than the width of said belt, said shield being positioned with said elongated slot in alignment with the central portion of said belt.

5. The combination claimed in claim 4 wherein the end portion of said torch is movable from a position in which it is directed into said shield to a position in which it is directed away from said shield.

6. The combination claimed in claim 5 including means for driving said belt and means for moving said torch from one of said positions to the other, and a connection between said last named means and said driving means for producing automatic movement of the torch in accordance with operation and non-operation of said driving means.

7. In a device for the purpose described, sheaves mounted upon supporting means, a metallic sealing belt traversing said sheaves, means for driving said sheaves, a heating element adapted to contact said belt upon one side thereof, said heating element comprising a fluid-cooled, trough-shaped shield having a bottom portion including an elongated slot contacting said belt, and a torch having an end portion movable from a position in which it is directed into said shield to a position in which it is directed away from said shield, means mounting said torch for movement, said means including a shaft carrying a toothed pinion, a segment element having teeth meshing with the teeth of said pinion, said segment element being mounted for rocking movement, said segment element including a cam following roller to be contacted by a cam element during driven movement of said sheaves.

8. In combination for the purposes described, sheaves mounted upon supporting means, a sealing belt traversing said sheaves, a heating element adapted to contact said belt upon one side thereof, said heating element comprising a fluid-cooled, trough-shaped shield having a portion with an elongated slot adapted to be brought against said belt, and a torch having an end portion movable from a position in which it is directed into said shield to a position in which it is directed away from said shield, means for driving said belt, means for pressing juxtaposed film portions for sealing against the side of the said belt away from said heating means, means for moving said torch from one of said positions to another, and a connection between said last named means and the said driving means for producing automatic movement of the torch in accordance with operation and non-operation of said driving means.

9. In a device for the purposes described, a heating element comprising a fluid-cooled, trough-shaped shield having a bottom including an elongated slot, and a torch element having an end portion extending into said trough, whereby the flame from said torch element will impinge upon an object positioned beneath the elongated slot in said shield.

10. In a device for forming a welded seam in juxtaposed portions of readily fusible film, a continuous metallic belt for contacting the juxtaposed film portions, and a torch having a flame impinging on said metallic belt, whereby to uniformly heat said belt to the fusion temperature of said film portions irrespective of minor deviations in the surfaces of said belt.

11. The device claimed in claim 10 wherein the flame from said torch is directed into a shield overlying and contacting said belt, said shield having an elongated opening in the bottom thereof of lesser width than said belt and disposed centrally thereof, whereby the said flame is caused to impinge on the central portion only of said belt.

12. The device claimed in claim 10 wherein said shield includes bottom portions adjacent said slot contacting opposite edge portions of said belt, whereby to cool the said edge portions below the fusion temperature of the said film.

13. The device claimed in claim 10 wherein said shield includes bottom portions adjacent said slot contacting opposite edge portions of said belt, whereby to cool the said edge portions below the fusion temperature of the said film, the said shield having hollow walls through which a coolant is passed.

14. The device claimed in claim 13 including a cooling means contacting said belt beyond said torch and shield, whereby to cool the central portion of said belt below fusion temperature of the said film portions subsequent to contact by the heated belt, so as to permit the said film portions to be separated from the said belt.

References Cited in the file of this patent

UNITED STATES PATENTS

| Number | Name | Date |
|---|---|---|
| 2,542,901 | Chaffee | Feb. 20, 1951 |